United States Patent

[11] 3,615,769

| [72] | Inventors | Ernst Leitz<br>Wetzlar/Lahn;<br>Heinz Brömer, Herrmamstein, am<br>Hendsruck; Norbert Meinert,<br>Wetzlar/Lahn, all of Germany |
    |---|---|---|
    | [21] | Appl. No. | 17,424 |
    | [22] | Filed | Mar. 9, 1970 |
    | [23] | | Division of Ser. No. 786,726, Jan. 14, 1959, abandoned. |
    | [45] | Patented | Oct. 26, 1971 |
    | [73] | Assignee | Ernst Leitz, GmbH<br>Wetzlar/Lahn, Germany<br>Continuation-in-part of application Ser. No. 829,033, May 29, 1969, now Patent No. 3,563,773, which is a continuation-in-part of application Ser. No. 563,867, July 8, 1966, now abandoned. |

[54] LANTHANUM BOROSILICATE OPTICAL GLASS
    5 Claims, 1 Drawing Fig.

[52] U.S. Cl. .................................................... 106/54, 106/47 Q

[51] Int. Cl. ..................................................... C03c 3/04
    [50] Field of Search .......................................... 106/54, 47 Q

[56] References Cited
    UNITED STATES PATENTS
    3,486,915  12/1969  Brömer et al.............  106/54
    FOREIGN PATENTS
    1,061,976  7/1959  Germany.....................  106/54

*Primary Examiner*—Tobias E. Levow
    *Assistant Examiner*—W. R. Satterfield
    *Attorney*—Rauber & Lazar ABSTRACT: An optical glass is disclosed which consists essentially of (a) a glass base consisting of $B_{23}$, $SiO_2$ and $La_2O_3$, (b) of $ZrO_2$ and $Ta_2O_5$ or $Nb_2O_5$ and (c) of at least one constituent selected from a group including the oxides of such metals as magnesium, calcium, zinc, cadmium, aluminum, and tungsten. The index of refraction of the invented glass ranges in dependence on the percentage of the individual components from 1.80 to 1.83 while the Abbe numbers are between 43 and 45.

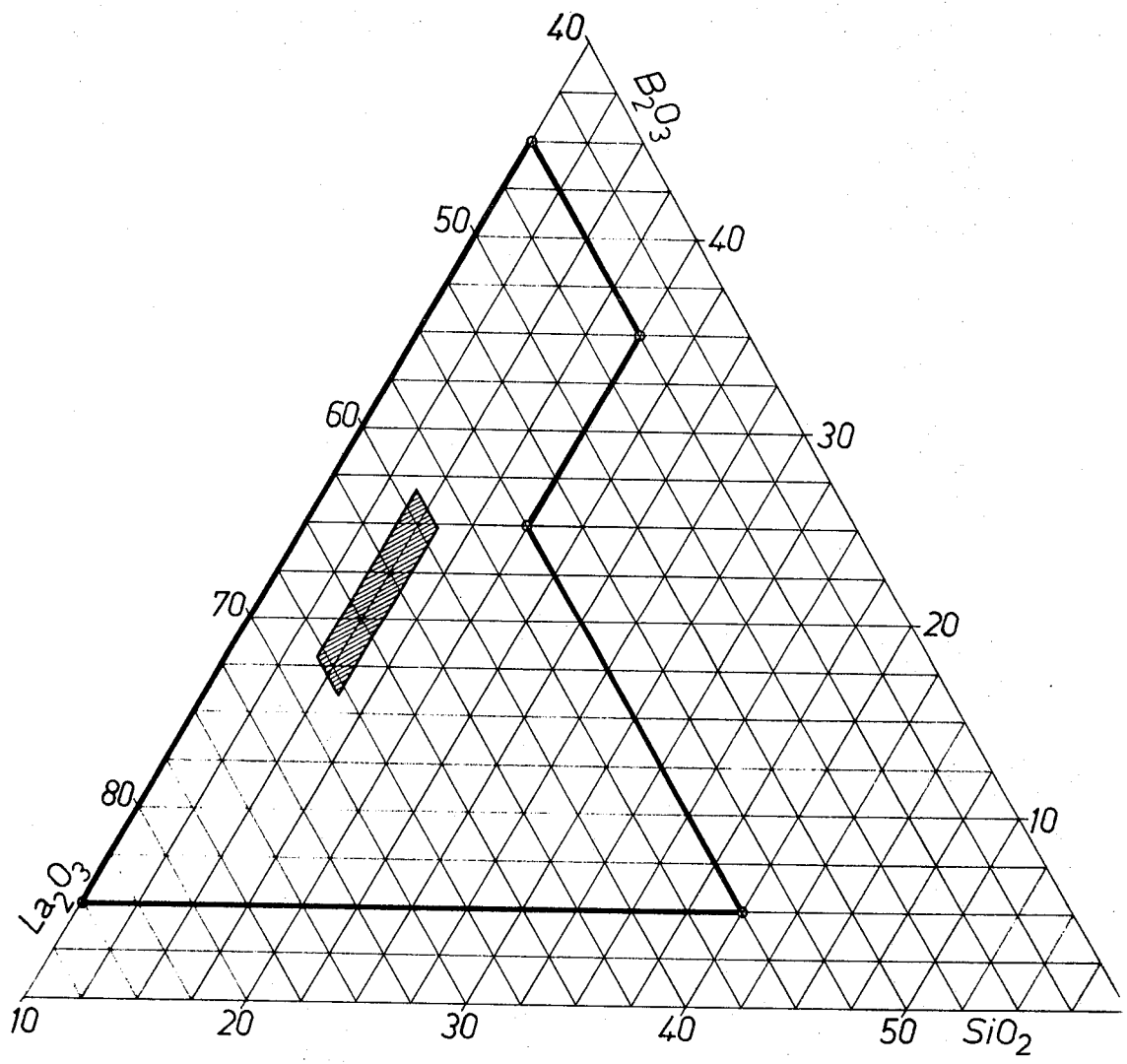

LANTHANUM BOROSILICATE OPTICAL GLASS

Our present application is a continuation-in-part application to our application Ser. No. 829,033, filed May 29, 1969, now U.S. Pat. No. 3,563,773, which itself is the continuation-in-part application of our copending application Ser. No. 563,867, filed July 8, 1966, which itself is a divisional application of our further application Ser. No. 786,726, filed Jan. 14, 1959 in the U.S. Pat. Office, the last two applications being now abandoned.

BACKGROUND AND SUMMARY OF THE INVENTION

The invention relates to an optical glass having a high index of refraction ($n_e$) and a relatively high Abbe number ($v_e$) and also having a high chemical resistance and stability, hardness and other properties requisite for an optical glass.

Although optical glasses having relatively high indices of refraction whose main constituents are lanthanum oxide ($La_2O_3$) and boric oxide ($B_2O_3$) are known, achievement of high indices of refraction by increasing the proportion of lanthanum oxide has been unsuccessful due primarily to the tendency of high lanthanum oxide-content glasses to devitrify. Secondarily, such glasses decrease the Abbe value markedly. Silica ($SiO_2$) has been used in very small proportions to stabilize the lanthanum oxide effect of devitrification.

It is the object of this invention to provide an optical glass overcoming such limitations having nevertheless extremely high proportions of lanthanum oxide together with relatively high proportions of boric oxide ($B_2O_3$) and silica (silicon dioxide) ($SiO_2$). The glass of the present invention consists of 68 to 78 percent by weight of a glass base of boric oxide ($B_2O_3$), silica ($SiO_2$) and lanthanum oxide ($La_2O_3$) in proportions lying within the boundary of the area outlined in the ternary diagram shown in the accompanying drawing. The balance of the glass consists of 6 to 8 percent by weight of zirconium dioxide, of 7 to 10 percent by weight of tantalum or niobium pentoxide, and of at least one of certain additives which may alter the index of refraction and Abbe number or may be useful in modifying other physical properties of the glass.

In addition, we have found that the sum of the glass-former constituents of the glass base, namely silica and boric oxide should be in sum 25 to 28.5 percent of the total weight, and the modifying oxide portion of the glass base, namely the lanthanum oxide, should be within the range of 40 to 53 percent of the total weight.

Glasses made in accordance with this invention have indices of refraction ($n_e$) within the range of 1.80 to 1.83, having corresponding Abbe values ($v_e$) ranging between 43 and 45.

In connection with this recipe, for example glasses, can be molten as listed in table 1.

TABLE 1

| Melt 1 | Percent by weight | Melt 2 | Percent by weight | Melt 3 | Percent by weight |
|---|---|---|---|---|---|
| $SiO_2$ | 12.5 | $SiO_2$ | 12.5 | $SiO_2$ | 9.8 |
| $B_2O_3$ | 12.5 | $B_2O_3$ | 12.5 | $B_2O_3$ | 18.5 |
| MgO | 2.0 | MgO | 2.0 | ZnO | 15.2 |
| CaO | 1.5 | CaO | 1.5 | CdO | 0.4 |
| ZnO | 0.5 | ZnO | 0.5 | $Al_2O_3$ | 1.0 |
| $Al_2O_3$ | 0.3 | $Al_2O_3$ | 0.5 | $La_2O_3$ | 41.3 |
| $La_2O_3$ | 52.7 | $La_2O_3$ | 53.0 | $ZrO_2$ | 6.5 |
| $ZrO_2$ | 7.5 | $ZrO_2$ | 7.5 | $Nb_2O_5$ | 7.3 |
| $Ta_2O_5$ | 10.0 | $Ta_2O_5$ | 10.0 | | |
| $WO_3$ | 0.5 | | | | |
| $n_e$=1.821 | | $n_e$=1.815 | | $n_e$=1.800 | |
| $v_e$=45.0 | | $v_e$=45.0 | | $v_e$=43.0 | |

Ternary diagram: $SiO_2 + B_2O_3 + La_2O_3$ = 100% by weight

| $SiO_2$ | 16.1 | $SiO_2$ | 16.0 | $SiO_2$ | 14.1 |
| $B_2O_3$ | 16.1 | $B_2O_3$ | 16.0 | $B_2O_3$ | 26.6 |
| $La_2O_3$ | 67.8 | $La_2O_3$ | 68.0 | $La_2O_3$ | 59.3 |

For illustration purposes we prepared a batch formulation of the constituents listed in table 1 of a total weight of 5 kg. Initially the constituents are intimately mixed and thereafter melted in a platinum crucible at a temperature of 1300° to 1350° C. After fusion has been completed the temperature is raised to 1400° C. and the melt is refined while continuously stirring. The refining time for this step usually is 120 minutes. At the end of the refining period the furnace is shut off and the melt is cooled to a temperature of 1280° C. with continuous agitation. After that temperature has been reached cooling is continued without agitation to a temperature of about 1200° C. At this temperature the melt is poured into preheated molds and is cooled thereafter in the manner well known in this art.

What is claimed is:
1. An optical glass consisting essentially of
   a. a glass base consisting of 77 to 78 percent by weight of $B_2O_3$, $SiO_2$ and $La_2O_3$;
   b. 10 percent by weight of $Ta_2O_5$ 7.5 percent by weight of $ZrO_2$ 0.5 percent by weight of ZnO 0.3 to 0.5 percent by weight of $Al_2O_3$;
   c. 3 to 4 percent by weight of at least one constituent of the oxides of a group of metals consisting of: M9, Ca, Cd and W; and
   d. with the amount of $B_2O_3$ ranging between 12 to 13 percent, the amount of $SiO_2$ ranging between 12 to 13 percent, and the amount of $La_2O_3$ ranging between 52 to 53 percent of the total glass weight.

2. An optical glass as claimed in claim 1 and having a refractive index $n_e$=1.821 and an Abbe number $v_e$=45.0, the glass being melted from a batch composition consisting of:

| % by weight | |
|---|---|
| 12.5 | $B_2O_3$ |
| 12.5 | $SiO_2$ |
| 52.7 | $La_2O_3$ |
| 7.5 | $ZrO_2$ |
| 2.0 | MgO |
| 1.5 | CaO |
| 0.5 | ZnO |
| 0.3 | $Al_2O_3$ |
| 10.0 | $Ta_2O_5$ |
| 0.5 | $WO_3$ |

3. An optical glass as claimed in claim 1, and having a refractive index $n_e$=1.815 and an Abbe number $v_e$=45.0, the glass being melted from a batch composition consisting of:

| % by weight | |
|---|---|
| 12.5 | $B_2O_3$ |
| 12.5 | $SiO_2$ |
| 53.0 | $La_2O_3$ |
| 7.5 | $ZrO_2$ |
| 2.0 | MgO |
| 1.5 | CaO |
| 0.5 | ZnO |
| 0.5 | $Al_2O_3$ |
| 10.0 | $Ta_2O_5$ |

4. An optical glass consisting essentially of:
   a. a glass base consisting of: 69 70 percent by weight of $B_2O_3$, $SiO_2$ and $La_2O_3$;
   b. 7.3 percent by weight of $Nb_2O_5$ 6.5 percent by weight of $ZrO_2$ 15.2 percent by weight of ZnO 1.0 percent by weight of $Al_2O_3$;
   c. 0.4 percent of at least one constituent of the oxides of a group of metals consisting of: Mg, Ca, Cd and W; and
   d. with the amount of $B_2O_3$ ranging between 18 to 19 percent, the amount of $SiO_2$ ranging between 9 to 10 percent, and the amount of $La_2O_3$ ranging between 41 to 42 percent of the total glass weight.

5. An optical glass as claimed in claim 4 and having a refractive index $n_e$=1.800 and an Abbe number $v_e$=43.0, the glass being melted from a batch composition consisting of:

| % by weight | |
|---|---|
| 18.5 | $B_2O_3$ |
| 9.8 | $SiO_2$ |
| 41.3 | $La_2O_3$ |
| 6.5 | $ZrO_2$ |
| 15.2 | ZnO |
| 0.4 | CdO |
| 1.0 | $Al_2O_3$ |
| 7.3 | $Nb_2O_5$ |

PO-1050
(5/69)

UNITED STATES PATENT OFFICE
CERTIFICATE OF CORRECTION

Patent No. 3,615,769          Dated October 26, 1971

Inventor(s) Ernst Leitz; Heinz Bromer; Norbert Meinert

It is certified that error appears in the above-identified patent and that said Letters Patent are hereby corrected as shown below:

Page 1, Line 3, address of Heinz Bromer, "Herrmamstein" should be --Hermannstein--;

Page 1, Line 4, address of Heinz Bromer, "Hendsdruck" should be --Hundsdrück--;

Page 1, Abstract, Line 2, "$B_{23}$" should be --$B_2O_3$--;

Column 2, line 16, "$Zro_2$" should be --$Zr\ O_2$--

Column 2, line 18 "M9" should be --Mg--;

Column 2, line 53, "6970" should be --69-70--

Signed and sealed this 16th day of May 1972.

(SEAL)
Attest:

EDWARD M. FLETCHER, JR.          ROBERT GOTTSCHALK
Attesting Officer          Commissioner of Patents